US008564900B2

(12) United States Patent
Hirono et al.

(10) Patent No.: US 8,564,900 B2
(45) Date of Patent: Oct. 22, 2013

(54) HERMETICALLY-SEALED DISK DRIVE DEVICE WITH FLOW AMOUNT ADJUSTER AND LOW-DENSITY GAS SEALED THEREIN

(75) Inventors: Yoshiyuki Hirono, Kanagawa (JP); Takashi Kouno, Ibaraki (JP); Kouki Uefune, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 1004 days.

(21) Appl. No.: 12/157,425

(22) Filed: Jun. 9, 2008

(65) Prior Publication Data
US 2008/0310048 A1 Dec. 18, 2008

(30) Foreign Application Priority Data
Jun. 15, 2007 (JP) .................................. 2007-158312

(51) Int. Cl.
G11B 33/14 (2006.01)
G11B 25/04 (2006.01)

(52) U.S. Cl.
USPC ..................................... 360/97.18; 360/99.19

(58) Field of Classification Search
USPC .......... 360/97.01–97.04, 98.01, 97.12, 97.13, 360/97.16, 97.17, 97.18, 99.18, 99.19; 156/145; 29/402.02, 426.1, 469, 509, 29/603.04, 603.06
See application file for complete search history.

(56) References Cited

U.S. PATENT DOCUMENTS

| 5,417,743 | A  | * | 5/1995 | Dauber | ..................... | 360/97.02 |
|---|---|---|---|---|---|---|
| 6,395,073 | B1 | * | 5/2002 | Dauber | ..................... | 360/99.17 |
| 7,876,528 | B2 | * | 1/2011 | Uefune et al. | ............. | 360/97.02 |
| 2003/0179489 | A1 | * | 9/2003 | Bernett et al. | ............. | 360/97.01 |
| 2003/0218828 | A1 | * | 11/2003 | Hong et al. | ................. | 360/97.02 |
| 2005/0068666 | A1 |  | 3/2005 | Albrecht et al. | | |
| 2005/0219740 | A1 | * | 10/2005 | Repphun et al. | ........... | 360/97.02 |
| 2006/0203377 | A1 | * | 9/2006 | Yamaguchi | ................ | 360/97.01 |
| 2007/0103811 | A1 | * | 5/2007 | Olszewski | ................ | 360/97.02 |

FOREIGN PATENT DOCUMENTS

JP 62-071078 A 4/1987

* cited by examiner

*Primary Examiner* — Craig A. Renner (57) ABSTRACT

In a disk drive device having a double cover structure with low-density gas enclosed therein, embodiments of the present invention help to securely perform leak inspection on an outer cover and to prevent defects caused in joining the outer cover. According to one embodiment, a hard disk drive (HDD) comprises a flow amount adjuster on a base-facing side of its inner cover. Helium gas in an enclosure goes out through a ventilation hole via diffusion channel of a flow amount adjuster. The emitted helium gas remains in the space between the inner cover and an outer cover. This achieves easier detection of the leakage of helium gas from the joining section of the outer cover and prevention of emission of too much helium gas from the enclosure.

3 Claims, 7 Drawing Sheets

HERMETICALLY-SEALED DISK DRIVE DEVICE WITH FLOW AMOUNT ADJUSTER AND LOW-DENSITY GAS SEALED THEREIN

CROSS-REFERENCE TO RELATED APPLICATION

The instant nonprovisional patent application claims priority to Japanese Patent Application No. 2007-158312 filed Jun. 15, 2007 and which is incorporated by reference in its entirety herein for all purposes.

BACKGROUND OF THE INVENTION

Conventional hard disk drives (hereinbelow, referred to as HDDs) rotate magnetic disks and drive head gimbal assemblies (hereinbelow, referred to as HGAs) at high speed in response to requests for huge capacity, high recording density, and high-speed accessing. These cause substantial fluctuation of air (turbulence) that buffets the magnetic disks and HGAs. This turbulence buffeting can lead to disturbance in positioning heads for data which are recorded on a magnetic disk with high-density. This is because the turbulence occurs at random and it is difficult to estimate its magnitude and cycle so that swift and accurate positioning control becomes complex and difficult. The turbulence buffeting may also cause noise to impair the quietness of the device.

Another issue caused by the influence of the air within the device due to the high-speed rotation, is an increase of electric power consumption. When the magnetic disk is rotated at high speed, the air around the disk is dragged and rotated together. On the other hand, the air away from the magnetic disk remains still so that shearing force arises therebetween to become a load against the rotation of the disk. This is called as windage loss, which becomes larger as the disk rotates at higher speed. In order to rotate the disk at high speed against the windage loss, a motor will require larger output and more electric power.

Given that the above-described turbulence and windage loss are proportional to the density of the gas within the device, there is an idea to reduce the turbulence and windage loss by enclosing low-density gas instead of air in a hermetically-sealed HDD. Hydrogen, helium, or the like is exemplified as the gas having a lower density than air, but helium is optimum because it is effective, stable, and safe in considering actual use. HDDs with sealed helium gas can solve the above-described issues and realize swift and accurate positioning control, power saving, and satisfactory quietness.

However, molecules of helium are so small and the diffusion coefficient of helium is large. Therefore, there has been an issue that enclosures used for usual HDDs are poorly sealed so that helium gas leaks easily during normal use. In order to make it possible to hermetically seal low-density gas such as helium gas, for example, a technique disclosed in a U.S. Patent Publication No. 2005/0068666 ("Patent Document 1") described below has been suggested.

Since helium gas escapes easily as described above, welding or solder jointing is considered as appropriate for sealing an HDD. If an HDD is determined to be defective upon inspection after assembly, parts in the HDD are replaced to repair the HDD. In order to perform this repair easily, it is desirable not to weld or solder joint until the inspection is completed after helium gas has been enclosed.

The above-described Patent Document 1 discloses a method for sealing the HDD with doubled covers as an approach to solve this dilemma. This method seals the HDD, until the end of the inspection step, with a primary cover having a low helium-gas-permeable gasket which can be easily disassembled and replaced. Then, after passing the inspection, it attaches a secondary cover and seals the HDD by welding or soldering the second cover. Thus, utilizing a double cover structure enables the HDD to be hermetically sealed with helium gas and the components to be disassembled and replaced easily after the inspection.

In the step of fixing the secondary cover by welding or soldering, dust or gas may be generated. Especially, generation of gas in welding will be an issue. If the dust or gas enters the interior space where a magnetic disk and the other components are placed, reliability in a head-disk interface will be reduced. Therefore, it is important to prevent the dust or gas from entering the interior space in joining.

On this occasion, in order to prevent the helium gas from leading from the finished HDD, the welded or soldered sealing section of the secondary cover should be inspected and confirmed that the helium gas is not leaking. However, if the above-described double cover structure is adopted, since a certain level of sealing property is secured by the primary cover, leaks may not be able to be detected at the inspection step notwithstanding the presence of a leak hole at the sealing section of the secondary cover.

Then, in order to prevent intrusion of dust or gas into the interior space in joining or to assure the leak inspection on the secondary cover, a ventilation hole may be provided on the primary cover to let a certain quantity of helium gas flow out therethrough while joining the secondary cover. However, if the ventilation hole is merely provided on the primary cover, large amounts of helium gas may leak at the time of fixing the secondary cover so that the necessary helium gas may not be left in the HDD. On the other hand, if the flow-out amount of the helium gas is too little, it may be impossible to securely prevent intrusion of dust or gas, or to conduct a reliable gas leak inspection.

BRIEF SUMMARY OF THE INVENTION

In a disk drive device having a double cover structure with low-density gas enclosed therein, embodiments of the present invention help to securely perform leak inspection on an outer cover and to prevent defects caused in joining the outer cover. According to the particular embodiment of FIGS. 1 and 5, a HDD 1 comprises a flow amount adjuster 601 on a base-facing side of its inner cover. Helium gas in an enclosure goes out through a ventilation hole 221 via diffusion channel 611 of a flow amount adjuster 601. The emitted helium gas remains in the space between the inner cover and an outer cover. This achieves easier detection of the leakage of helium gas from the joining section of the outer cover and prevention of emission of too much helium gas from the enclosure.

DETAILED DESCRIPTION OF THE INVENTION

Embodiments of the present invention relate to a disk drive device and a fabricating method thereof and, more particularly, to a hermetically-sealed disk drive device for sealing low-density gas, such as helium gas, within the device and a fabricating method thereof.

A method of fabricating a disk drive device according to an aspect of embodiments of the present invention disposes a disk, a motor for rotating the disk, a head for accessing the disk, and a moving mechanism for supporting and moving the head in a base. The method fixes a primary cover having a ventilation hole sealed with a sealing label and flow amount adjuster for reducing a flow amount of gas which passes through the ventilation hole, to form an enclosure for enclosing the disk, the motor, the head, and the moving mechanism. It fills gas having a lower density than air in the enclosure so that pressure in the enclosure becomes higher than air pressure. It removes the sealing label, and disposes a secondary cover so as to cover the primary cover while emitting the low-density gas via the ventilation hole and the low amount adjuster. And it joins the disposed secondary cover to the base, and seals an inside of the enclosure including the primary cover. Emitting the low-density gas through the flow amount adjuster prevents too much emission of the low-density gas and suppresses intrusion of dust or gas.

The flow amount adjuster may comprise a diffusion channel for reducing a flow amount of gas passing through the ventilation hole, and the primary cover is fixed to the base so that a side of the primary cover on which the diffusion channel is disposed faces the disk. The diffusion channel can effectively control the flow amount of the gas. In addition, the flow amount adjuster further comprises a filter for gas passing through the diffusion channel. The filter can effectively suppress intrusion of dust.

Pressure inside the enclosure formed by the primary cover and the base may be higher than the air pressure until a completion of joining the secondary cover. This results in that a necessary amount of the low-density gas remains inside the enclosure and achieves effective suppression of intrusion of gas or dust into the inside.

An amount of the low-density gas emitted through the ventilation hole and the flow amount adjuster until a completion of joining the secondary cover may be more than a Volume of a space between the secondary cover and the primary cover. This achieves more reliable inspection on joining the secondary cover.

A disk drive device according to another aspect of embodiments of the present invention comprises a disk, a motor for rotating the disk, a moving mechanism for supporting and moving the head, and an enclosure for enclosing the disk, the motor, the head and the moving mechanism, and for hermetically containing gas having a lower density than air. The enclosure comprises a base, a primary cover fixed to the base and having a ventilation hole through which the gas passes, a secondary cover disposed so as to cover the primary cover and sealing inside of the enclosure which is joined to the base and includes the primary cover, and a diffusion channel formed on a disk-facing side of the primary cover and connected to the ventilation hole. This diffusion channel prevents too much emission of the low-density gas from the inside of the enclosure and suppresses intrusion of dust or gas.

The disk drive device may further comprise a filter through which the gas passing through the diffusion channel passes. This achieves prevention of intrusion of dust into the enclosure. The disk drive device may further comprise a moisture absorber for absorbing moisture in the gas passing through the diffusion channel. This achieves humidity control in the enclosure.

According to embodiments of the present invention, in a disk drive device with low-density gas sealed in and a double cover structure, intrusion of dust or gas into the primary cover is prevented and more reliable leak inspection on a secondary cover can be performed.

Hereinafter, particular embodiments of the present invention are described. For clarity of explanation, the following description and the accompanying drawings contain omissions and simplifications as appropriate. Throughout the drawings, the like components are denoted by like reference numerals, and their repetitive description is omitted if not necessary for the sake of clarity. In the present embodiment, a hard disk drive (HDD) is described as an example of a disk drive device.

Figure 1:
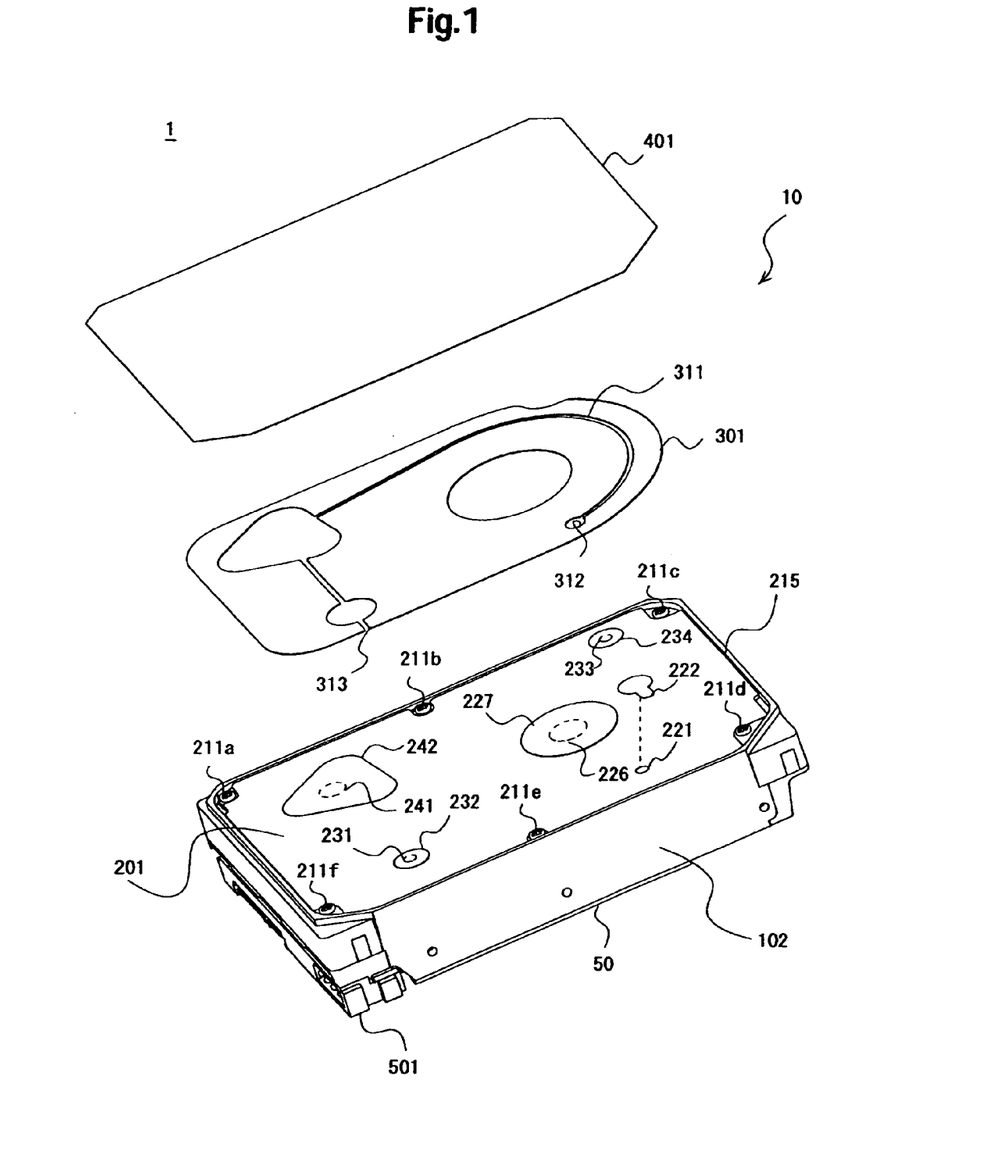
FIG. 1 is an exploded perspective view schematically showing the configuration of the hermetically-sealed HDD according to one embodiment.

FIG. 1 is an exploded perspective view schematically illustrating the configuration of the hermetically-sealed HDD 1 according to one embodiment. The HDD 1 comprises a head disk assembly (HDA) 10 and a control circuit board 50 fixed to the outer bottom surface of the HDA 10. The control circuit board 50 has an interface connector 501 to an external host. The HDA 10 has a base 102, an inner cover 201 as a primary cover, an adhesive layer 301, and an outer cover 401 as a secondary cover. These are main components of an enclosure. The inner cover 201 is fixed to the base 102 with screws 211a to 211f with a gasket (not shown in FIG. 1) interposed therebetween and the components included in the HDA 10 are housed in an interior space formed by the base 102 and the inner cover 201.

Figure 2:
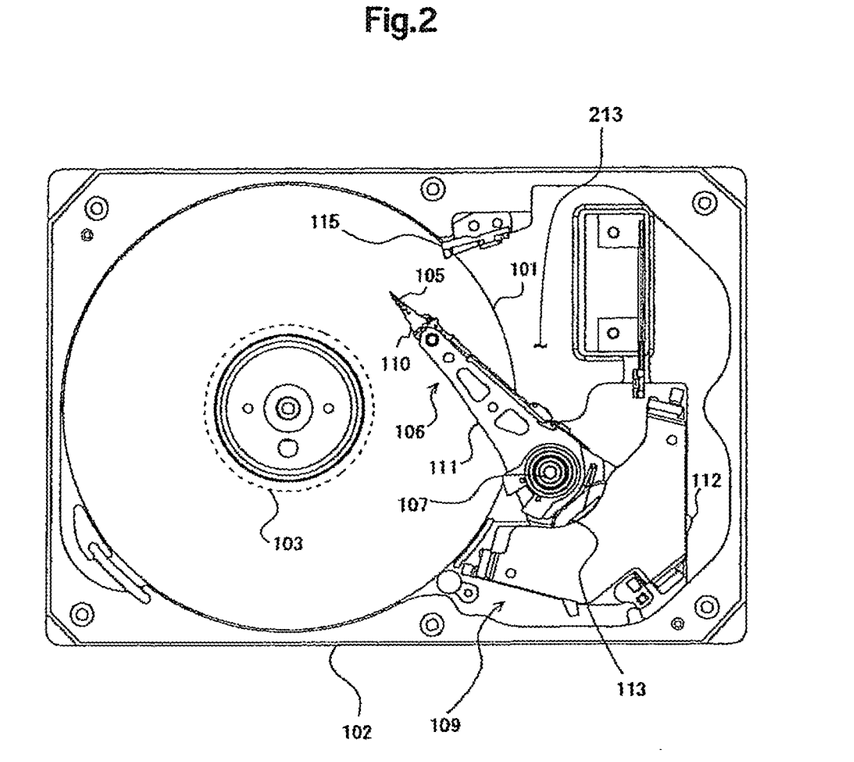
FIG. 2 is a top view of the HDD according to one embodiment with the cover removed from the enclosure.

Before describing each of the components shown in FIG. 1, the configuration within the interior space formed by the inner cover 201 and the base 102 will be described referring to FIG. 2. Operation of each component in the interior space is controlled by the control circuit on the control circuit board 50. FIG. 2 is a top view of the hermetically-sealed HDD 1 with the inner cover 201 and the outer cover 401 removed from the enclosure. The components of the HDD 1 are housed in the base 102. The HDD 1 comprises a magnetic disk 101 which is a disk for recording data. A head slider 105 comprises a head element portion for retrieving and/or writing user data from and/or to the magnetic disk 101 and a slider a surface on which the head element portion is formed.

The actuator 106 supports and moves the head slider 105. The actuator 106 is supported pivotably about a pivotal shaft 107 and is driven by a voice coil motor (VCM) 109 as a driving mechanism. An assembly of the actuator 106 and the VCM 109 is a moving mechanism of the head slider 105. The actuator 106 comprises components of a suspension 110, an arm 111, a coil support 112, and a flat coil 113 connected along the longitudinal direction in order from the tip end of the actuator where the head slider is placed. A head gimbal assembly (HGA) is constituted by a suspension 110 and the head slider 105.

A spindle motor (SPM) 103 fixed to the base 102 rotates magnetic disk 101 at a specific angular rate. The actuator 106 moves the head slider 105 over a data area on the surface of the rotating magnetic disk 101 for data retrieval/write from and to the magnetic disk 101. The pressure by viscosity of the air between the air bearing surface (ABS) of the slider facing the magnetic disk 101 and the rotating magnetic disk 101 balances to the pressure applied toward the magnetic disk 101 by the suspension 110 so that the head slider 105 files above the magnetic disk 101. When the magnetic disk 101 stops rotating, for example, the actuator 106 retracts the head slider 105 to a ramp 115. Or, embodiments of the present invention may be applied to an HDD with the contact start and stop (CCS) scheme.

Returning to FIG. 1, the enclosure of the HDA 10 of the present embodiment has a base 102 for housing the above-described components, an inner cover 201 for closing a top opening of the base 102, an outer cover 401 placed so as to cover the inner cover 201, and an adhesive layer 301 interposed between the inner cover 201 and the outer cover 401 and adhering them. The outline of the adhesive layer 301 is smaller than the outlines of the outer cover 401 and the inner cover 201.

In the HDD 1 of the present embodiment, low-density gas which has lower density than air is enclosed in the interior space. This suppresses turbulence and windage loss caused by the rotation of the magnetic disk 101 or the pivot of the actuator 106. Although hydrogen or helium is considered as the low-density gas to be used, helium is optimum because it is much effective, stable, and safe. Hereinbelow, a case using helium is described by way of example. The HDD 1 includes the removable inner cover 201 and the outer cover 401 for preventing leakage of the helium gas so that rework in fabricating steps becomes easy and leakage of the helium gas from the HDD 1 as a finished product can be effectively prevented.

In fabricating steps of the HDD 1, the head slider 105 is first fabricated. Aside from the head slider 105, the suspension 110 is fabricated. The head slider 105 is fixed to the suspension 110 to fabricate the HGA. Then, the arm 111 and the VCM coil are fixed to the HGA to fabricate a head stack assembly (HSA) which is an assembly of the actuator 106 and the head slider 105. In addition to the fabricated HSA, the SPM 103, the magnetic disk 101, and the like are mounted within the base 102, and then the inner cover 201" is fixed to the base 102 with screws 211*a* to 211*f*. The inner cover 201 is formed by a plate made of stainless steel, aluminum, brass, or the like. A gasket which is a belt-shaped sealing material made of elastic body such as fluororubber is provided between the inner cover and the base 102.

The inner cover 201 with the gasket fixed is secured with the screws 211*a* to 211*f*, then helium gas is enclosed into the interior space formed by the inner cover 201 and the base 102. The method for injecting the helium gas injects helium gas through an injection hole 233 formed on the inner cover 201 and emits the gas inside the interior space through an emission hole 231. Then, the injection hole 233 and the emission hole 231 are sealed with sealing labels 232 and 234, respectively, as shown in FIG. 1. After that, the control circuit board 50 is mounted; servo writes and operation inspections on the HDD 1 are performed with the helium gas enclosed; and then the outer cover 401 is fixed. Thus, in the inspection step, the outer cover 401 and the adhesive layer 301 have not been mounted yet.

The inspection step inspects whether or not there is a defective part which cannot satisfy the required specification and performance level. If it detects a defective part, it returns the device to the assembling step, removes the one attached inner cover 201, and performs repair work (rework) to replace only the defective part. The inner cover 201 is merely secured with the screws 211*a* to 211*f* and can be removed easily so that the rework step will not be disturbed.

The device which has satisfied the required specification and performance level in the inspection step is moved to the assembling step again and the adhesive layer 301 and the outer cover 401 are mounted thereon. On this occasion, the section where the helium gas in the enclosure is likely to leak is the joining section of the base 102 and the outer cover 401. In order to hermetically seal the particular section, the upper part 215 of the side wall of the base 102 and the outer cover 401 are laser-welded or solder jointed. The joining section of the outer cover 401 and the base 102 is provided around their whole peripheries so as to surround the periphery of the top opening of the base 102 and the periphery of the inner cover 201. This seals the inner cover 201 and the interior space hermetically.

In laser-welding or solder jointing, the materials of the base 102 and the outer cover 401 should be selected in view of their durability, reliability, and cost. For example, either set of the base 102 formed by aluminum die-casting and the aluminum outer cover 401 formed by pressing or cutting, or the base 102 formed by cold forging from an aluminum alloy whose contents of copper and magnesium are relatively small and the aluminum outer cover 401 formed by pressing or cutting is preferably selected.

As described above, performing the operation inspection on the HDD 1 in a state that the helium gas is temporarily sealed by use of the inner cover 201 makes a rework in the HDD 1 easier. Additionally, the above-described complete joining of the outer cover 401 for hermetically sealing the device after passing the inspection step or after passing the re-inspection step following the repair work can prevent leak of the helium gas after product delivery.

In the fabricating steps of the HDD 1, an inspection for leak of helium gas from the joining section 411 (see FIG. 3) of the outer cover 40 *l* and the base 102 is performed in order to prevent the helium gas from decreasing after product delivery. In the leak inspection, a helium gas detector is used. However, since a certain sealing property is secured by means of the gasket and the inner cover 201, leakage of the helium gas may not be detected in the inspection step regardless of presence of joining defect at the joining section 411 (see FIG. 3).

As shown in FIG. 1, the inner cover 201 of the present embodiment has a ventilation hole 221 to be a ventilation path for helium gas. The ventilation hole 221 is sealed by a sealing label 222 before the outer cover 401 is mounted. This prevents large amounts of the helium gas in the interior space 213 (see FIG. 2) from decreasing after the inner cover 201 is mounted until the outer cover 401 is mounted. The sealing label 222 is removed after the operation inspection step has been finished and before the outer cover 401 is mounted. The helium gas in the interior space 213 (see FIG. 2) escapes through the ventilation hole 221 into the space between the outer cover 401 and the inner 201. If a leak hole exists at the joining section 411 (see FIG. 3) of the outer cover 401 and the base 102, this helium gas leaks through the leak hole at the joining section 411 (see FIG. 3) so that the detector can surely detect the leakage. This achieves a more reliable leak inspection on the joining section 411 (see FIG. 3).

The HDD 1 of the present embodiment further comprises an adhesive layer 301 on which a channel 311 is formed for the helium gas from the ventilation hole 221 to flow therethrough. The adhesive layer 301 bonds the outer cover 401 and the inner cover 201. The outer cover 401 is generally formed thick because it is fixed by welding or the enclosure size is specified by a regulation so that its strength is small.

Therefore, bonding the outer cover 401 securely to the inner cover 201 with the adhesive layer 301 achieves reinforcement of the outer cover 401.

Figure 3:
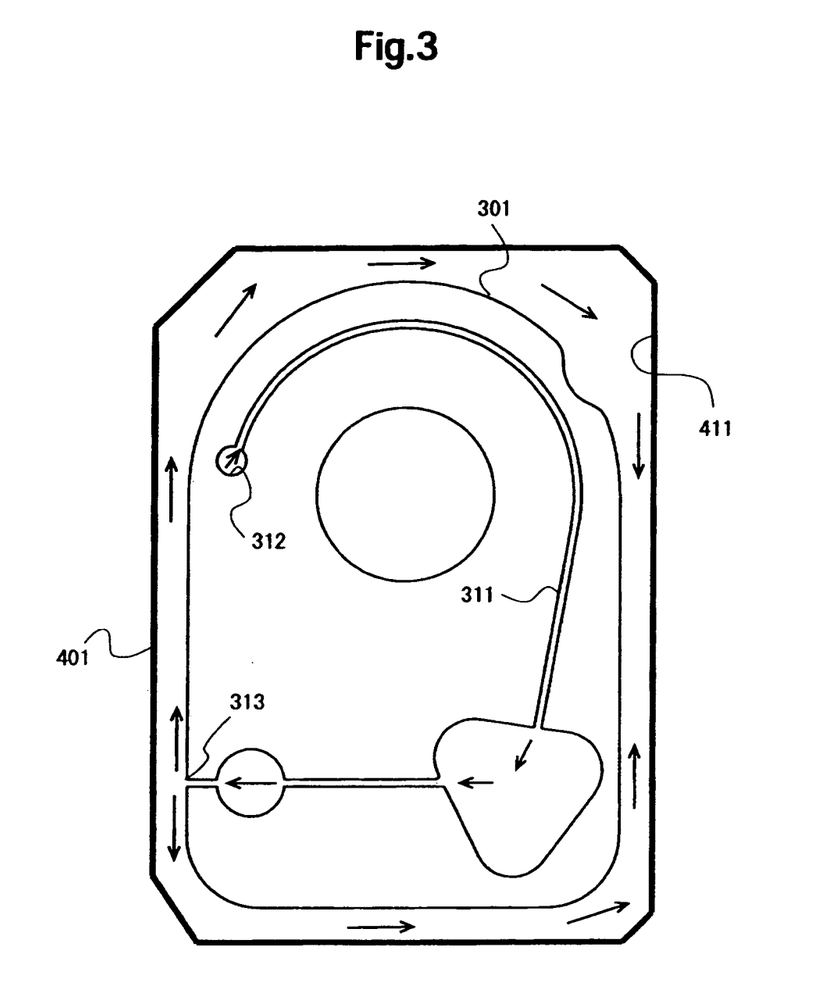
FIG. 3 illustrates the outer cover in one embodiment with the adhesive layer bonded, viewed from the adhesive layer side.

FIG. 3 shows the outer cover 401 bonded to the adhesive layer 301, as viewed from the adhesive layer 301 side. FIG. 3 also shows the joining section 411 of the outer cover 401 for upper part 215 (see FIG. 1) of the base 102. The helium gas coming out from the ventilation hole 221 on the inner cover enters the channel 311 through an inlet 312 thereof and goes out through an outlet 313. The outline of the adhesive layer 301 is smaller than the shape of the inner periphery of the joining section 411 of the outer cover 401 and the base 102. Therefore, the helium gas which flowed out through the channel 311 remains in a space between the outer rim of the adhesive layer 301 and the joining section 411. If there is any leak hole in the joining section 411 due to defective joining, helium gas leaking to the outside through the leak hole can be easily detected.

With further reference to FIGS. 1 and 3, the channel 311 functions to convey the helium gas to the joining section 411 slowly so that the helium gas does not leak too much in joining the outer cover 401. Besides, it prevents dust or gas from reaching the ventilation hole 221 on the inner cover 201 and entering the interior space in joining. Parts of the channel 311 are configured by openings formed to avoid the ventilation hole 221 on the inner cover 201, and sealing labels 242 and 232. The sealing label 242 seals a hole 241 for a screw to secure the VCM and the sealing label 227 seals a hole 226 for a screw to secure the SPM 103.

As described above, the channel 311 can suppress the emission amount and the emission rate of the helium gas from the interior space formed by the inner cover 201 and the base 102 and prevent dust or gas from entering the interior space from the outside. However, much helium gas may be emitted after removing the sealing label 222 from the ventilation hole 221 until bonding the outer cover 401 with the bonded adhesive layer 301 to the inner cover 201. Moreover, during the same period, dust may intrude into the base 102 from the outside. It is important to prevent dust or gas from intruding into the base 102 more securely during joining the outer cover 401.

The HDD 1 according to the present embodiments comprises a flow amount adjuster connected to the ventilation hole 221 on the rear side (the side facing the base 102) of the inner cover 201. This flow amount adjuster suppresses the emission of the helium gas through the ventilation hole 221 and prevents dust or gas from flowing in from the outside. Hereinbelow, this flow amount adjuster will be described in detail.

Figure 4:
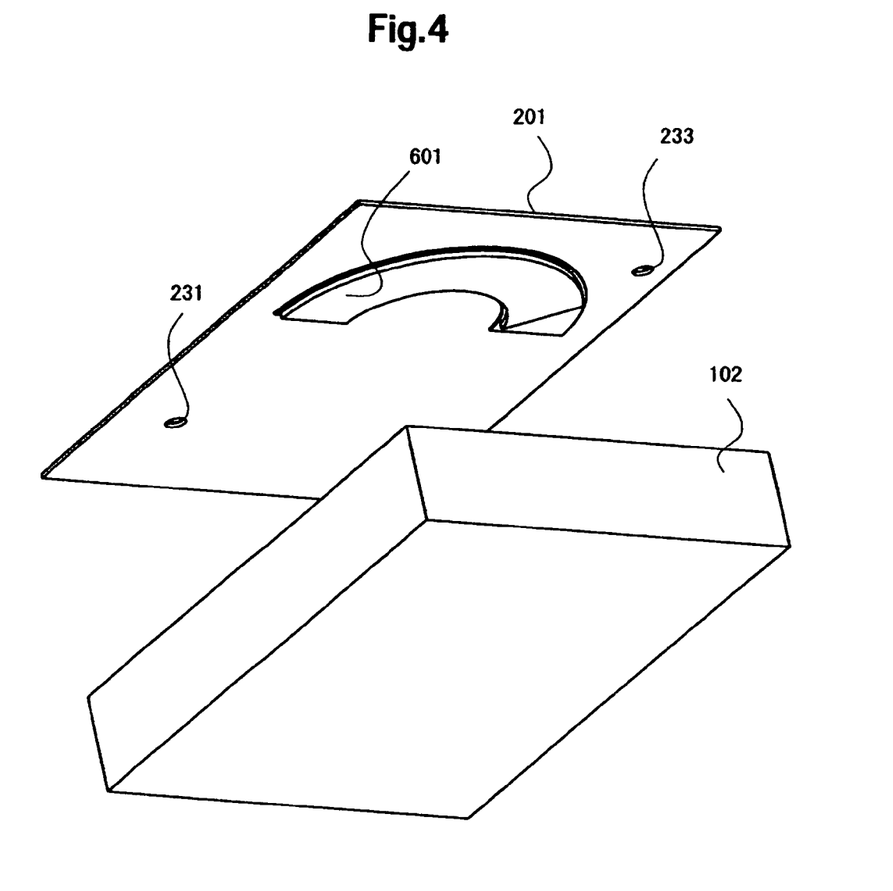
FIG. 4 is a view illustrating the flow of the helium gas, the view showing the outer cover with the adhesive layer bonded, viewed from the adhesive layer side.

FIG. 4 is a perspective view schematically showing a base 102-facing side of the inner cover 201. On the base 102-facing side of the inner cover 201, a half-ring shaped flow amount adjuster 601 is fixed. In fabricating the HDD 1, the inner cover 201 with the flow amount adjuster 601 is secured to the base 102 with screws 211a to 211f. On this occasion, the inner cover 201 is secured to the base 102 with screws 211a to 211f. On this occasion, the inner cover 201 is secured so that the flow amount adjuster 601 faces the base 102.

Figure 5:
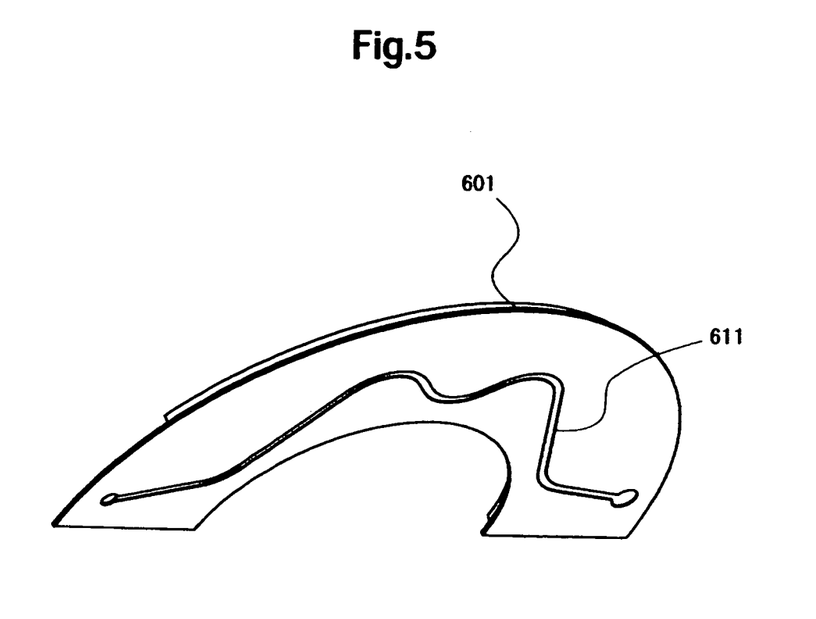
FIG. 5 is an exploded perspective view schematically showing the configuration of the hermetically-sealed HDD according to another embodiment, having a different shape of ventilation path from the one in the HDD shown in FIG. 1.
Figure 6:
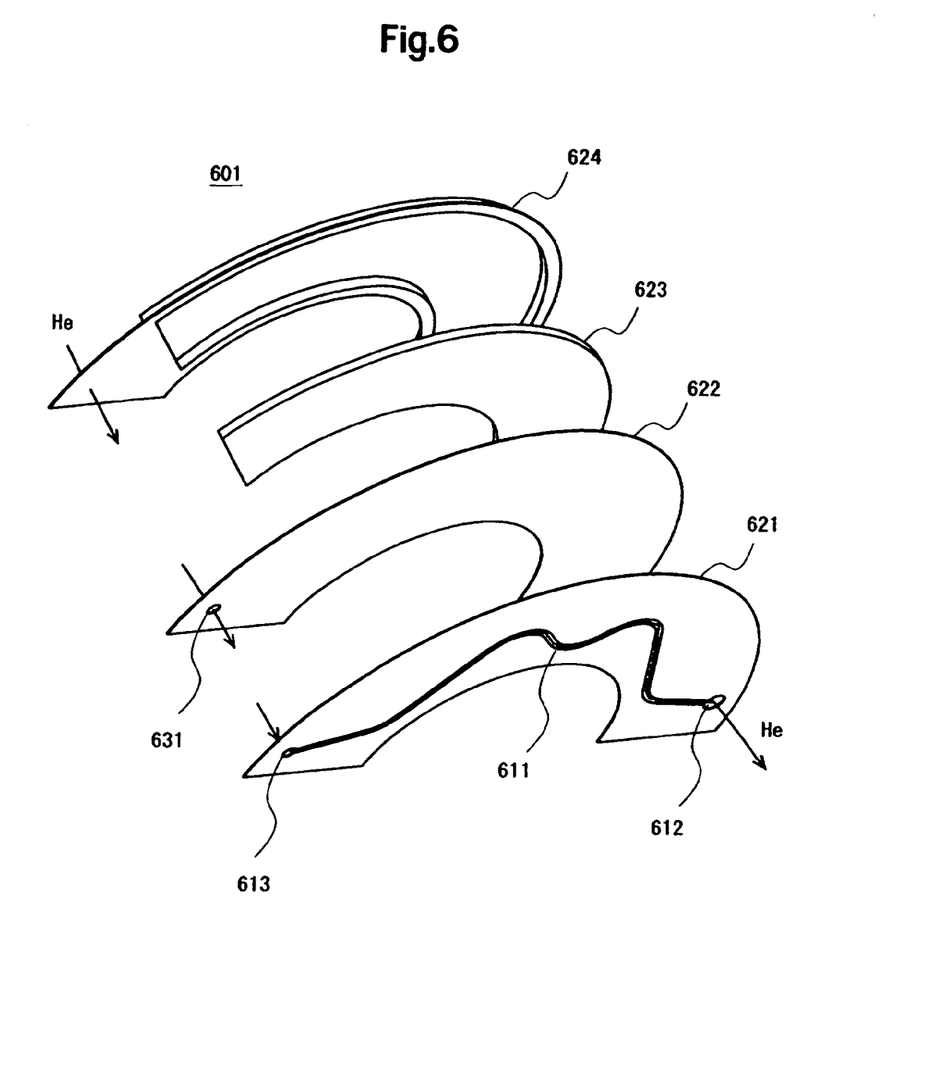
FIG. 6 is an exploded perspective view of the flow amount adjuster according to one embodiment.

FIG. 5 is a perspective view showing the inner cover 201-facing side of the flow amount adjuster 601. On the inner cover 201-facing side of the flow amount adjuster 601, a diffusion channel 611 is formed. FIG. 6 is an exploded perspective view of the flow amount adjuster 601. The flow amount adjuster 601 comprises a first adhesive layer 621, a second adhesive layer 622, a moisture absorber 623 containing activated carbon or silica gel, and a filter membrane 624. The first adhesive layer 621 is bonded to the base 102 facing-side of the inner cover 201. The diffusion channel 611 is formed in the first adhesive layer 621.

As illustrated in FIG. 6, the filter membrane 624 is exposed within the interior space of the base 102 and the other members are covered by the filter membrane 624. The filter membrane 624 prevents intrusion of dust into the base 102 from the outside. The moisture absorber 623 is provided between the filter membrane 624 and the second adhesive layer 622 to absorb moisture in the space within the base 102. The outline of the second adhesive layer 622 is the same as the first adhesive layer 621. The moisture absorber 623 and the filter membrane 624 are bonded to the second adhesive layer 622. The respective both sides of the first adhesive layer 621 and the second adhesive layer 622 have adhesiveness.

One end 612 of the diffusion channel 611 is connected to the ventilation hole 221 on the inner cover 201. The other end 613 is connected to a hole 631 on the second adhesive layer 622. In joining the outer cover 401 to the base 102, the helium gas inside the base 102 flows from the end 613 of the diffusion channel 611 to the end 612 and flows out through the ventilation hole 221 on the inner cover 201 to the outside. The space from the end 613 of the diffusion channel 611 to the end 612 is defined by the first adhesive layer 621, the second adhesive layer 622, and the inner cover 201.

The first adhesive layer 621 and the second adhesive layer 622 are not substantially permeable to helium gas. The moisture absorber 623 is not substantially permeable to helium gas either. Helium gas passes through the filter membrane 624. The hole 631 on the second adhesive layer 622 does not overlap the moisture absorber 623 and is exposed to the filter membrane 624. Therefore, helium gas passes through the filter membrane 624 and the hole 631 on the second adhesive layer 622 into the diffusion channel 611, goes along through the diffusion channel 611, and goes out through the ventilation hole 221.

The diffusion channel 611 control the flow amount of the helium gas and prevents intrusion of gas or dust from the outside. From these points of view, it is preferable that the diffusion channel 611 bends as shown in FIG. 5. It is important that the helium gas continues to flow out until completion of joining the outer cover 401. This results in prevention of intrusion of gas or dust from the outside. Moreover, it is necessary that the interior space has been filled with helium gas at the time of completion of joining. The diffusion channel 611 reduces the flow amount of the helium gas flowing out to the outside through the ventilation hole 221 to accomplish the above two points.

In order to fill the interior space between the inner cover 201 and the base 102 with necessary helium gas, it is important that the internal pressure in the interior space is higher than the air pressure in the outside at the time of the completion of joining the outer cover 401. This achieves prevention of dust or gas intrusion from outside because necessary amount of helium gas continues to flow out.

In addition, it is important that the amount of the flowing out helium gas is more than the space volume between the outer cover 401 and the inner cover 201. This enables leak inspection on the joining section 411 of the outer cover 401 to be performed securely. The space between the outer cover 401 and the inner cover 201 means the space filled out with gas. In the above example, the sum of the space of the channel 311 and the space between the outline of the adhesive layer 301 and the joining section 411 corresponds to this space.

The flow amount of the helium gas is determined by the shape of the channel 311 on the adhesive layer 301, the shape of the diffusion channel 611, and the initial internal pressure in the interior space. In fabricating the HDD 1, helium gas is injected into the interior space so that the internal pressure becomes higher than the outside air pressure. When the sealing label 222 is removed, the helium gas flows out through the ventilation hole 221. The helium gas continues to flow out until the completion of joining the outer cover 401 and the base 102.

At the time of the completion of joining the outer cover 401, the internal pressure of the interior space is higher than the air pressure and the interior space is filled with sufficient helium gas. Between the outer cover 401 and the inner cover 201, the flowing out helium gas pushes the air out so that sufficient amount of helium gas for leak detection has filled the space. In designing the HDD, the flow amount adjuster 601, the adhesive layer 301, and the injection amount of helium gas should be designed to satisfy these conditions.

Figure 7:
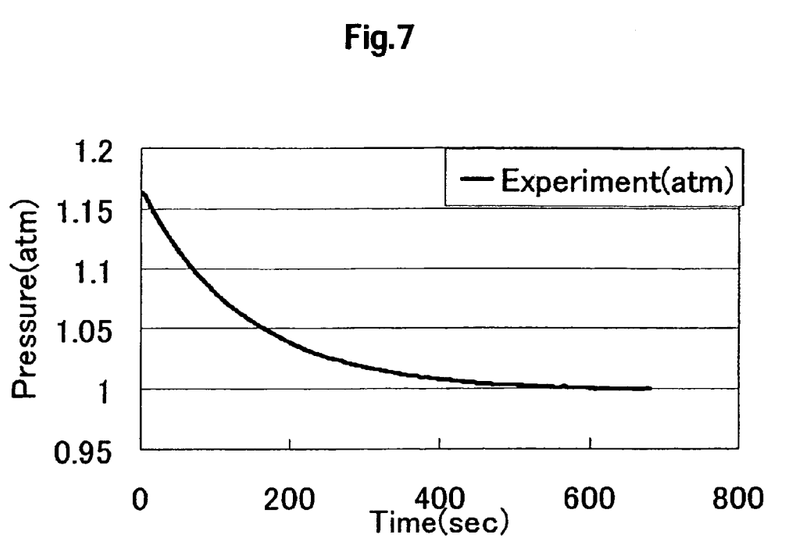
FIG. 7 is a view showing experimental results on variation in the internal pressure in the interior space in one embodiment.

FIG. 7 shows experimental results on variation in the internal pressure in the interior space. Bonding a flow amount adjuster with the same configuration as the flow amount adjuster 601 shown in FIG. 6 to the inner cover, variation in the internal pressure were monitored after removing sealing labels. The outer cover had not been joined. The initial value of the internal pressure was 1.16 atms. The internal pressure decreased drastically once the sealing label was removed and then the decreasing rate became smaller. After 300 sec., which is generally taken to join the outer cover, the internal pressure was approximately 1.02 atms. The preferable value for the final internal pressure is approximately 1.01 to 1.02 atms, which is a larger value than the 1.00 atm of the air pressure. It has been found that the flow amount adjuster according to embodiments of the present invention can sufficiently control the flowing out of the helium gas.

As set forth above, the present invention is described by way of the particular embodiments but is not limited to the above embodiments. A person skilled in the art can easily modify, add, and convert each element in the above embodiments within the scope of the present invention. For example, embodiments of the present invention are particularly useful to an HDD, but may not be applied to disk drive devices other than the HDD. The outer cover and the base are preferably joined by solder or weld but other joining methods are not eliminated.

As described above, it may be desirable to use both of the flow amount adjuster for the interior space and the channel for controlling flow amount between the inner cover and the outer cover, but only the flow amount adjuster for the interior space may be used. If there is no adhesive layer between the inner cover and the outer cover, necessary flow amount of the helium gas will increase by some extent.

The flow amount adjuster may be disposed between the inner cover and the outer cover. For example, a flow amount adjuster without the moisture absorber is prepared and fixed on the outside-facing side of the inner cover. The outlet end of the diffusion channel is sealed with a sealing label. After the inner cover is fixed to the base, the sealing label is removed to let the helium gas flow out. Then, the outer cover is joined to the base. At this time, the outer cover and the inner cover are preferably bonded together by the adhesive layer to reinforce the outer cover.

As described above, a flow amount adjuster having a diffusion channel may be desirable, but a flow amount adjuster with a different structure may be used. It may be desirable to more securely prevent dust or the like from intruding from the outside by means of the filter membrane, but it is not eliminated that the filter membrane is omitted depending on the designs. It may be desirable to provide the moisture absorber in the flow amount adjuster, but it may be omitted. If the moisture absorber is not used or helium gas passes through the moisture absorber, it is necessary that the second adhesive layer is not permeable to helium gas. However, if the moisture absorber is not permeable to the gas, the second adhesive layer may have permeability to the gas or may be omitted.

What is claimed is:

1. A disk drive device comprising:
    a disk;
    a motor for rotating the disk;
    a moving mechanism for supporting and moving a head; and
    an enclosure for enclosing the disk, the motor, the head, and the moving mechanism, and for hermetically containing gas comprising a lower density than air, the enclosure comprising:
        a base;
        a primary cover fixed to the base, the primary cover including a ventilation hole;
        a flow amount adjuster for reducing a flow amount of gas which passes through the ventilation hole, wherein said flow amount adjuster is substantially C-shaped and is disposed directly over said disk, the flow amount adjuster comprising:
            a first adhesive layer bonded to a disk-facing side of the primary cover, and including a diffusion channel formed in the first adhesive layer, wherein a first end of said diffusion channel is disposed proximate a first end of said first adhesive layer and a second end of said diffusion channel is disposed proximate a second end of said first adhesive layer, wherein said first adhesive layer is substantially C-shaped;
            a second adhesive layer,
            a filter membrane to suppress intrusion of dust, and
            a moisture absorber to absorb moisture in the gas passing through the diffusion channel,
            wherein the filter membrane and the moisture absorber are bonded to the second adhesive layer, and a space from said first end of the diffusion channel to said second end of the diffusion channel is defined by the first adhesive layer, the second adhesive layer and the primary cover;
        a secondary cover disposed so as to cover the primary cover, the secondary cover joined to the base, and sealing the primary cover inside of the enclosure and wherein the diffusion channel is formed on a disk-facing side of the primary cover, and is connected to the ventilation hole; and
        a third adhesive layer disposed between said primary cover and said secondary cover, wherein said third adhesive layer comprises:
            a second channel, wherein said gas travels through said second channel to a space between a periphery of said third adhesive layer and a joining of said primary cover and said secondary cover.

2. The disk drive device according to the claim 1, wherein pressure inside the enclosure formed by the primary cover and the base is higher than air pressure until a completion of joining the secondary cover.

3. The disk drive device according to the claim 2, wherein an amount of low-density gas emitted through the ventilation hole and the flow amount adjuster until a completion of joining the secondary cover is more than a volume of a space between the secondary cover and the primary cover.

* * * * *